United States Patent
Noeth

(10) Patent No.: US 8,939,610 B2
(45) Date of Patent: *Jan. 27, 2015

(54) ENERGY EFFICIENT ILLUMINATION APPARATUS AND METHOD FOR ILLUMINATING SURFACES

(71) Applicant: Illuminator Technology Inc., West Palm Beach, FL (US)

(72) Inventor: Raymond A. Noeth, West Palm Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/770,249

(22) Filed: Feb. 19, 2013

(65) Prior Publication Data

US 2013/0215486 A1 Aug. 22, 2013

Related U.S. Application Data

(63) Continuation of application No. 12/589,270, filed on Oct. 21, 2009, now Pat. No. 8,376,585.

(60) Provisional application No. 61/197,412, filed on Oct. 28, 2008.

(51) Int. Cl.

| | |
|---|---|
| *F21V 14/04* | (2006.01) |
| *G02B 5/02* | (2006.01) |
| *G02B 27/48* | (2006.01) |
| *G02B 26/10* | (2006.01) |
| *G03B 21/06* | (2006.01) |

(52) U.S. Cl.
CPC . *F21V 14/04* (2013.01); *G02B 5/02* (2013.01); *G02B 27/48* (2013.01); *G02B 26/10* (2013.01); *G03B 21/06* (2013.01); *Y10S 362/812* (2013.01)

USPC ........... 362/259; 362/282; 362/287; 362/322; 362/812

(58) Field of Classification Search
USPC ................. 362/259, 271–274, 277, 282–289, 362/319–325, 802, 812
See application file for complete search history.

(56) References Cited

U.S. PATENT DOCUMENTS

| | | |
|---|---|---|
| 3,541,323 A | 11/1970 | Stewart et al. |
| 5,402,324 A | 3/1995 | Yokoyama et al. |
| 5,764,315 A | 6/1998 | Yokota et al. |
| 5,863,113 A | 1/1999 | Oe et al. |
| 6,231,200 B1 | 5/2001 | Shinohara et al. |
| 6,712,481 B2 | 3/2004 | Parker et al. |
| 2007/0274075 A1 | 11/2007 | Nagamune |
| 2008/0187012 A1 | 8/2008 | Yamauchi et al. |
| 2009/0016061 A1 | 1/2009 | Chen et al. |
| 2009/0168424 A1 | 7/2009 | Yamauchi et al. |

OTHER PUBLICATIONS

Rolyn-Optics, Laser Beam Expander, http://www.directindustry.com/prod/rolyn-optics/laser-beam-expander-36206-227500.html.

*Primary Examiner* — Laura Tso

(57) ABSTRACT

A system for illuminating an object is provided, the system comprising a coherent or semi-coherent light source and a first diffuser positioned relative to the coherent or semi-coherent light source so as to receive said coherent or semi-coherent light. The first diffuser may diffuse the light to produce diffused light. An actuator having a moveable element, such as a moveable reflective surface, may be positioned to project the diffused light onto an object, and may be moved to project light onto different portions of the object. This movement may be performed with such rapidity that it is not perceived by a person viewing the object. Rather, the entire object would appear to be illuminated. Movement of the element may be controlled by a computer, and may be performed according to a predefined routine.

12 Claims, 24 Drawing Sheets

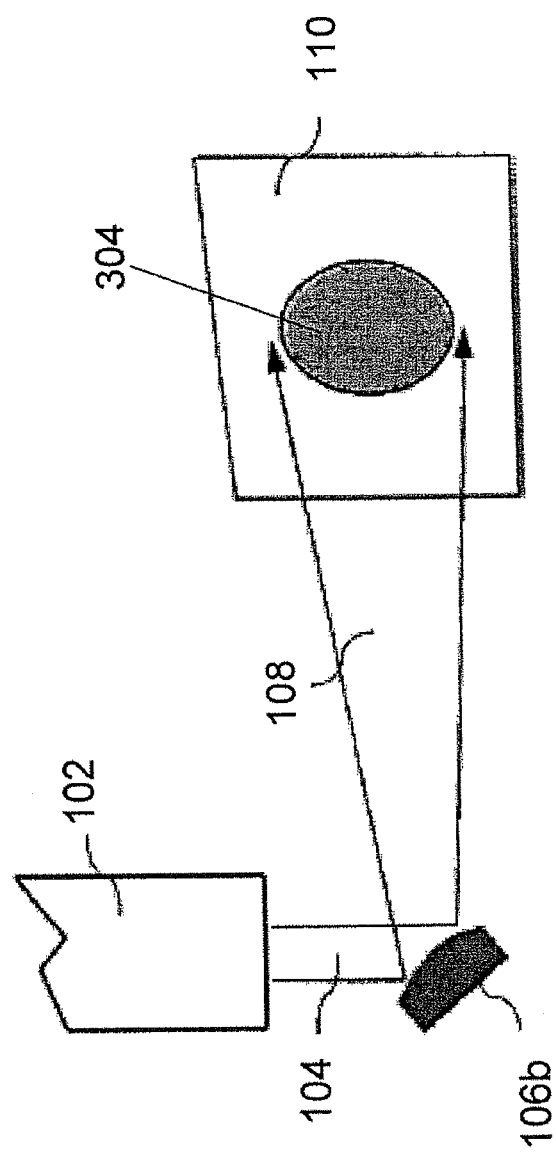

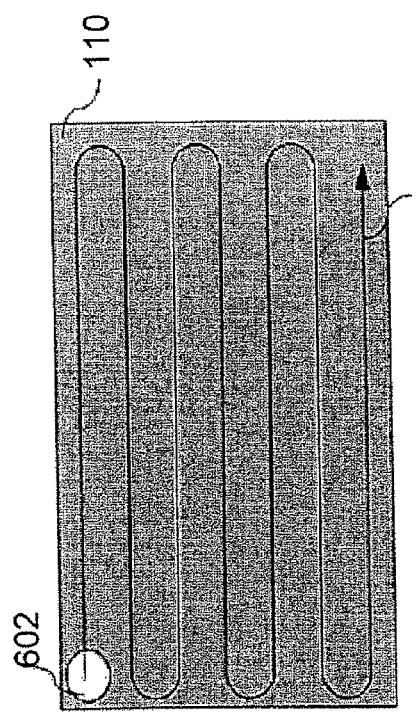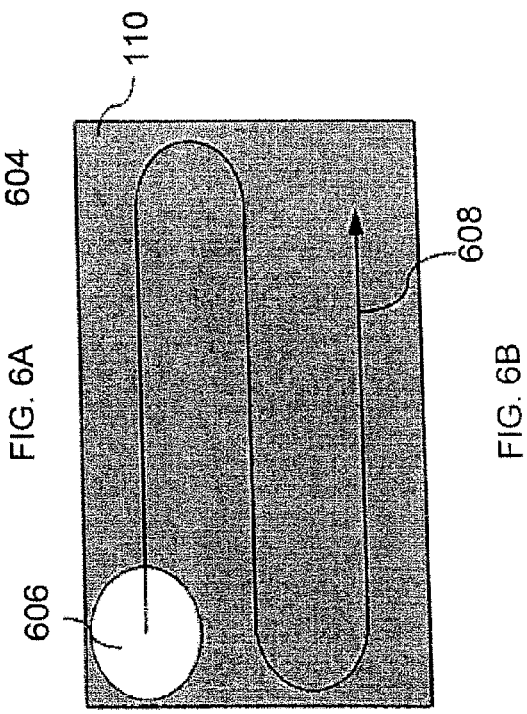
FIG. 6A
FIG. 6B

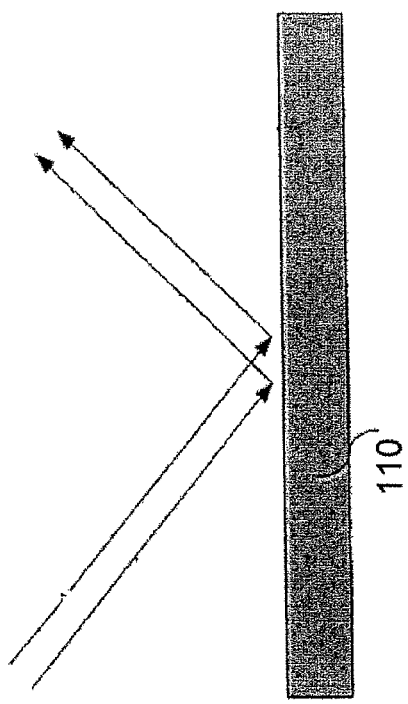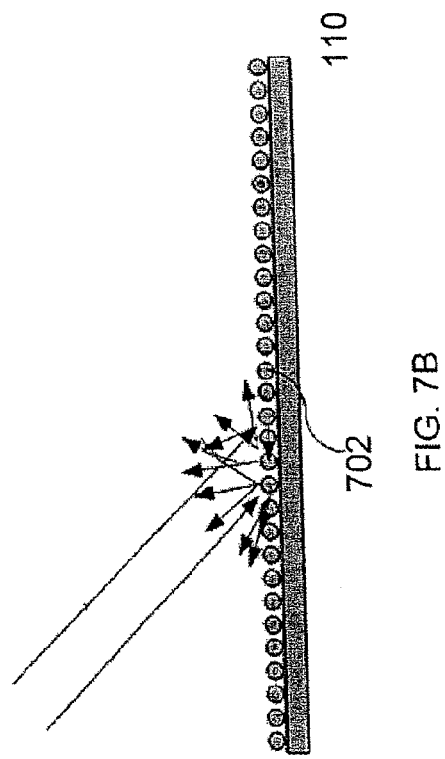

ENERGY EFFICIENT ILLUMINATION APPARATUS AND METHOD FOR ILLUMINATING SURFACES

CROSS-REFERENCE TO RELATED APPLICATIONS

The present application is a continuation of U.S. patent application Ser. No. 12/589,270, filed on Oct. 21, 2009, which is scheduled to issue as U.S. Pat. No. 8,376,585 on Feb. 19, 2013, which application claims the benefit of the filing date of U.S. Provisional Patent Application No. 61/197,412 filed Oct. 28, 2008, the disclosures of which are hereby incorporated herein by reference.

BACKGROUND OF THE INVENTION

Light sources produce incoherent light (i.e., which has a phase that varies randomly with time and position) or coherent light (i.e., which has a phase that does not vary randomly with time and position). The vast majority of light is produced from incoherent light sources (e.g., halogen bulbs, incandescent lamps, LED lights, etc.). The most common form of coherent light is produced by light amplification by stimulated emission of radiation (i.e., laser).

Typically, lasers produce coherent light by either emitted light in a narrow, low-divergence beam, or converted light into coherent light with the help of optical components such as lenses. The coherent light produced by lasers can be a narrow wavelength spectrum (i.e., monochromatic light), a broad spectrum (i.e., polychromatic light), or in some instances at multiple distinct wavelengths simultaneously (i.e., selectively-chromatic light). Some techniques presently used enable diffusion of the coherent light produced by lasers. For example, a laser beam may pass through a diffuser to spread the beam. Similarly, apertures may be placed in front of light projected from a laser to enable only some of the light to pass through the aperture.

The first lasers were gas lasers. Gas lasers require large power sources and generate significant quantities of heat radiation. Presently, there are many forms of lasers (e.g., chemical lasers, excimer lasers, fiber-hosted lasers, photonic crystal lasers, dye lasers, and free electron lasers). However, the advent of solid state lasers and semiconductor lasers have yielded commercial laser diodes capable of emitting coherent light at wavelengths from 375 nm to 1800 nm (and in some instances wavelengths of over 3 μm). These low power laser diodes only require 1 mW to 250 mW of power. Because of their extremely low energy requirements laser diodes have yielded numerous technological breakthroughs, such as, CD players, DVD Players, Laser pointers, laser printers, and numerous other devices. However, there are still many technological breakthroughs that have yet to be yielded by these low energy diodes.

Presently, the United States and the world are making efforts to reduce energy consumption. For example, there has been a large push in recent years to switch from incandescent light bulbs to compact fluorescent lamps. Some have even begun using LED (Light Emitting Diode) lamps as an even more energy efficient light source than compact fluorescent lamps. While these innovations are a step in the right direction, there is still a need to investigate other means for reducing energy consumption.

For example, a large quantity of electrical energy is consumed in illuminating signs and other surfaces at night. Notably, in April of 2009, the lights reflected off the surfaces of the Leonard P. Zakim Bridge were reported to cost over $5,000 per month and were thereby shutdown indefinitely. Further, many signs on the roads require lighting by highly inefficient high powered bulbs. Even further, many residential and commercial properties use similar bulbs to reflect off interior and exterior surfaces. Illuminating all of these surfaces creates a large burden, both environmentally and financially, due to the energy consumed. Thus, a need exists to create an energy efficient illumination apparatus and method for illuminating surfaces.

BRIEF SUMMARY OF THE INVENTION

One aspect of the invention provides a system for illuminating, comprising a coherent or semi-coherent light source and a first diffuser positioned relative to the coherent or semi-coherent light source so as to receive said coherent or semi-coherent light. The first diffuser may diffuse the light to produce diffused light. Further, an actuator having a moveable element may be positioned to project the diffused light onto an object. The moveable element may be a reflective surface. Movement of the element may be controlled by a computer, and may be performed according to a predefined routine.

According to one aspect, the diffused light may be further reflected off the object and onto a display surface. According to another aspect, the object may be a panel including a concave edge and/or a reflective coating. For example, the diffused light may be reflected off the moveable reflective surface of the actuator and through a concave edge of a panel to disperse light throughout the panel. Other edges of the panel may be coated with a reflective coating to further spread light throughout the panel, so that a display surface appears illuminated using a decreased amount of light from the source.

According to another aspect, the actuator and/or the moveable element may be positioned within the object. Alternatively or additionally, a second diffuser capable of moving relative to the first diffuser may be used. Further, the coherent light source, the first diffuser, and the actuator may be sized to fit within the object.

Another aspect of the invention provides a method for illuminating an object, comprising emitting coherent or semi-coherent light, diffusing the coherent or semi-coherent light to produce diffused light, projecting the diffused light onto the object, and scanning the diffused light in a predetermined pattern on the object. Such scanning may form an image, e.g., a particular shape, on a display surface. Further, at least one of color, brightness, or scanning pattern of the diffused light may be modified in response light a predetermined condition. Even further, the diffused beam may reflected off an object onto a display surface, for example, to achieve "backlighting."

Yet another aspect of the invention provides a system for illuminating an object, comprising a sensor for detecting a condition and an illumination device communicatively coupled to the sensor. The illumination device may comprise a coherent or semi-coherent light source, a diffuser positioned relative to the coherent light source so as to diffuse light from the semi-coherent or coherent light source to produce diffused light, and an actuator having a moveable element positioned to project the diffused light onto an object. The illumination device may be activated in response to detection of a condition by the sensor. According to one aspect, a processor may be communicatively coupled between the sensor and the illumination device, for example, to control activation of the illumination device. Moreover, the processor may be programmed to determine whether the illumination device requires maintenance. The condition detected by the sensor may relate to at least one of light, sound, pressure, movement, seismic waves, and color. Further, the condition detected by the sensor may be the presence of a motor vehicle, and the illumination device may in turn illuminate a road sign.

BRIEF DESCRIPTION OF THE DRAWINGS

FIGS. 3A-C illustrates several embodiments of reflective diffusers according to the invention.

FIGS. 6A-B illustrate scanning patterns according to an aspect of the invention.

FIGS. 7A-B are detailed views of viewing surfaces according to an aspect of the invention.

DETAILED DESCRIPTION

Figure 1:
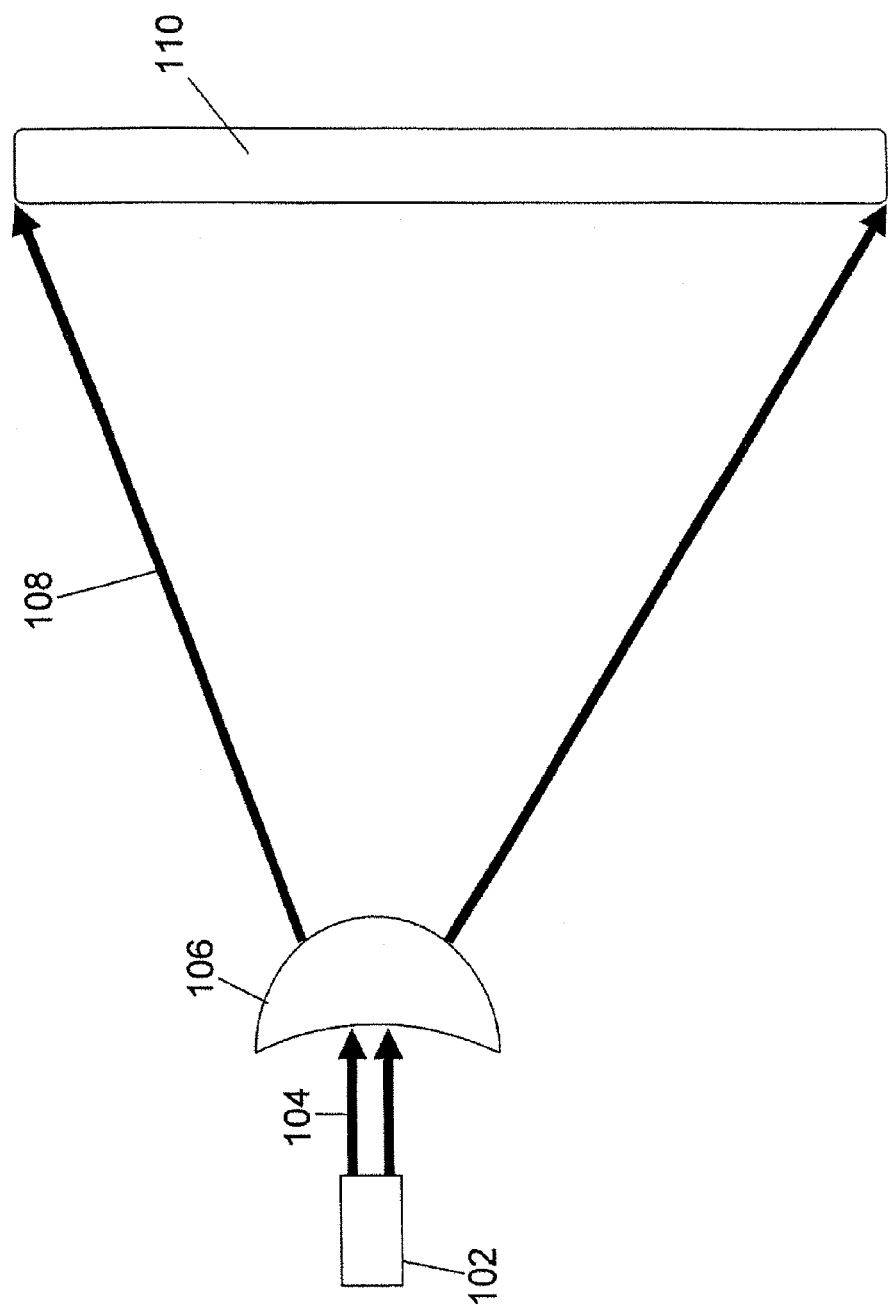
FIG. 1 is a side view illustration of diffusion of laser light according to an aspect of the invention.

This disclosed subject matter provides an apparatus and method for illuminating a surface for viewing. The apparatus and/or method include a laser light source and a diffuser for shaping the beam of light to a desired pattern sufficient to enable illuminating a surface for viewing. The desired pattern can be scanned across the surface for viewing in a predetermined path.

The diffuser can be at least one of a reflective diffuser and lens diffuser. Further, the diffuser can be any of an optical lens, a convex reflective surface, a concave reflective surface, and a substantially flat reflective surface. In some instances, the apparatus and/or method can further include a second diffuser capable of moving relative to the first diffuser. The second diffuser can move the desired pattern through a predetermined path. The second diffuser can be at least one of a second reflective diffuser and second lens diffuser. Further, the second diffuser can be any of an optical lens, a convex reflective surface, a concave reflective surface, and a substantially flat reflective surface. The apparatus and/or method can further include an aperture located between the diffuser and the surface for viewing. The aperture can be designed to only allow projecting of the desired pattern onto a specific region of the surface for viewing.

Scanning can be accomplished by various techniques. Scanning techniques can include the use of at least one dynamic diffuser, at least one dynamic laser, and any combination thereof alone or in conjunction. Accordingly, scanning can require driving any one of at least one dynamic laser and at least one dynamic diffuser.

By way of a first example, scanning can be accomplished with the assistance of a first fixator attached to the laser capable of moving the laser in a first axis; and a second fixator attached to the laser capable of moving the laser in a second axis. The first fixator and second fixator can be capable of moving the laser through the predetermined path along the first and second axis thereby causing the desired pattern to move through the predetermined path. For example, the first axis can be horizontal and the second axis can vertical. Thus, the predetermined path can be designed to scan the desired pattern horizontally and vertically across the surface for viewing.

By way of a second example, scanning can be accomplished with a first reflective diffuser and a second reflective diffuser. The first reflective diffuser can reflect the desired pattern in a first direction onto the second reflective diffuser; and the second reflective diffuser can reflect the pattern in a second direction. Thus, the first reflective diffuser and second reflective diffuser are capable of scanning the desired pattern through the predetermined path. Further, the first and second reflective diffuser can be any one of flat, convex, or concave. The first reflective diffuser can include multiple sides and can be designed to rotate about itself. The second reflective diffuser can be mounted on an angle to a rotating shaft. The combination of the first reflective diffuser having multiple sides and the second reflective diffuser mounted on an angle can yield a non-linear pattern.

It is to be understood that throughout the text of this application laser light is referred to in the broad sense of any coherent light source, including semi-coherent light sources. Accordingly, any form of suitable laser light source or coherent light source may be used. For simplicity a single laser light source is illustratively depicted and described. However, it is envisioned that more than one laser light source may be used collectively for illuminating a surface for viewing.

In some embodiments, an apparatus and method are disclosed that use a low power laser light source (e.g., solid state laser, semiconductor laser, etc.) for producing a laser light. This laser light interacts with a diffuser shaping the light to a desired pattern sufficient for illuminating a surface for viewing. In some instances, this surface for viewing can be a highly reflective surface such as a Department of Transportation ("DOT") sign (e.g., stop signs). Further, in some embodiments, for larger surfaces (e.g., DOT highway signs, billboards, etc.) the desired pattern can be moved (e.g., scanned) through a predetermined path at a substantially high velocity such that the entire surface for viewing is illuminated.

To ease understanding of the disclosed subject matter, the apparatus and method are described as being located on a static surface at an offset from the surface for viewing (e.g., stop signs, DOT highway signs, billboards, etc.). However, the disclosed subject matter can be located on a dynamic surface, for example, to compensate for vibration, adjust scanning, increase/decrease the predetermined path, or for any other reason deemed suitable. Further, the apparatus and method can be modified for a substantially larger scan (e.g., by adjusting aperture, increasing laser power, etc.) for use in a lighting system on, for example, a boat, a vehicle, an aircraft, part of an illumination system for aircraft landing, very large signs, reflectively painted runways, or for any other reason deemed suitable. Alternatively, the disclosed subject matter can be designed for use as a hand held device (e.g., as a hand held illuminator, etc).

Referring to FIG. 1, in some embodiments, a laser light source 102 produces a light 104 that is incoherently increased by a diffuser 106 expanding light 104 to light 108 that substantially covers the surface area of a surface 110. Diffuser 106 can be any device capable of expanding (i.e., spreading out or scattering) light. Further, the electrical energy (i.e., wattage) supplied to laser light source 102 can be adjusted thereby providing the appropriate quantity of light needed for illuminating the surface for viewing. For example, the laser light source can be adjusted for reflecting off of a DOT highway sign such that the sign is visible to a driver at a suitable distance from the sign.

Figure 2A:
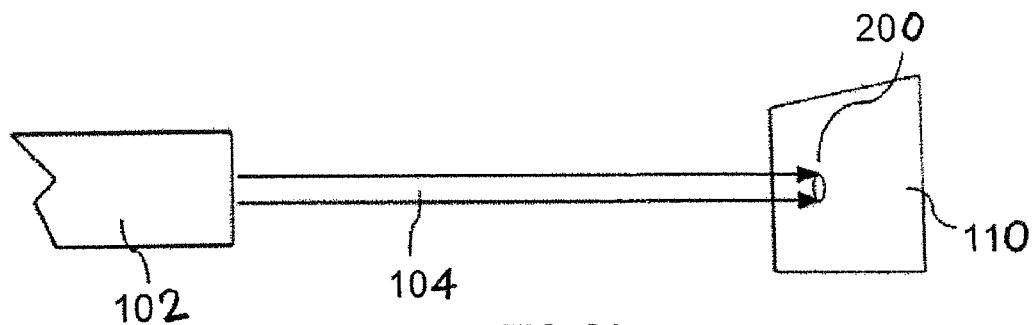
FIGS. 2A-2C are side view illustrations of a laser light source producing an image on a surface according to an aspect of the invention.

Referring to FIG. 2A, an illustrative depiction of laser light source 102 is shown producing light 104 (i.e., a coherent light beam) yielding a laser light spot 200 on surface 110. Laser light spot 200 is substantially small compared to surface 110 and thus can not illuminate all of surface 110.

Figure 2B:
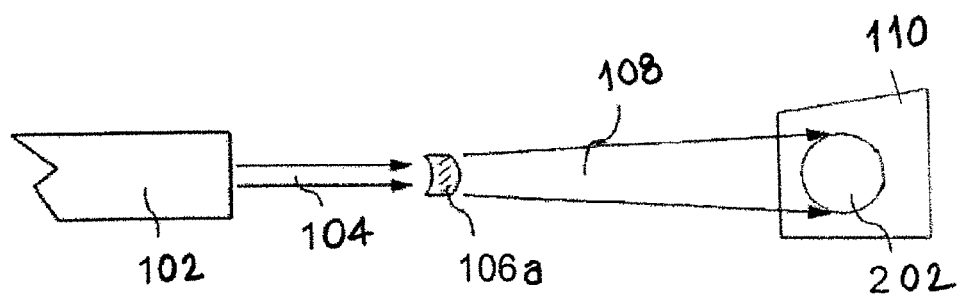
Figure 2C:
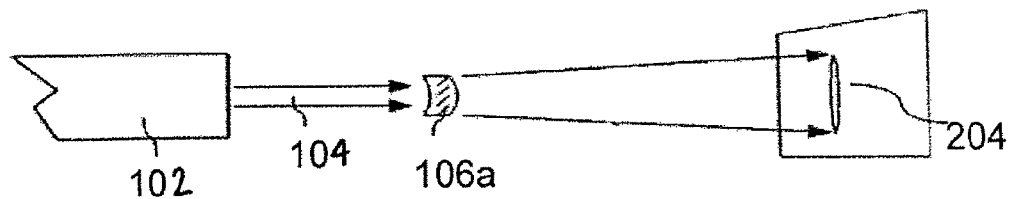

Referring to FIGS. 2B-C, diffuser 106 is illustratively depicted as a lens diffuser 106a, in accordance with some embodiments of the disclosed subject matter. Referring to FIG. 2B, light 104 produced by laser light source 102 is illustratively depicted as passing through lens diffuser 106a. As shown, lens diffuser 106a modifies the shape of light 104 (i.e., light 104 becomes semi-coherent) to light 108 creating a desired pattern 202 on surface 110. In some instances, modifying the shape of light 104 to light 108 allows for a greater area of illumination on surface 110. In some embodiments, lens diffuser 106a modifies light 104 to a substantially circular pattern. Referring to FIG. 2C, in other embodiments, lens diffuser 106a is capable of modifying light 104 into a substantially linear desired pattern 204. Further, although not shown, light 104 can be modified into any desired pattern, such as, but not limited to, a circular, oval, a substantially linear, any polygon pattern, or any geometric pattern deemed suitable.

Although described as a lens diffuser, diffuser 106a can be, but is not limited to, ground glass diffusers, Teflon® diffusers, holographic diffusers, opal glass diffusers, and greyed glass diffusers. Lens diffuser 106a can be ground or cut to diffuse the light in many different ways. For example, although not shown, lens diffuser 106a can modify light 104 into multiple lights. That is, lens diffuser 106a can be made in such a way as to modify light 104 from a single light to any plurality of lights. Although lens diffuser 106a is illustrated as a single diffuser, in some embodiments, multi-diffusers (e.g., multiple lens diffusers) can be used to create the desired pattern on surface 110.

Figure 3A:
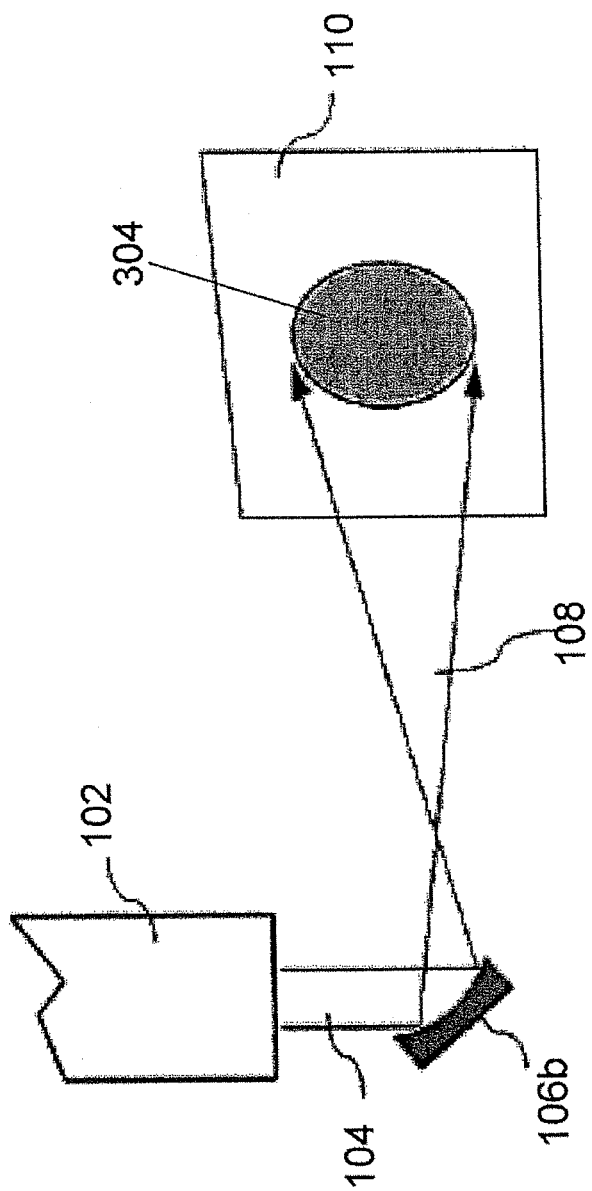
Figure 3C:
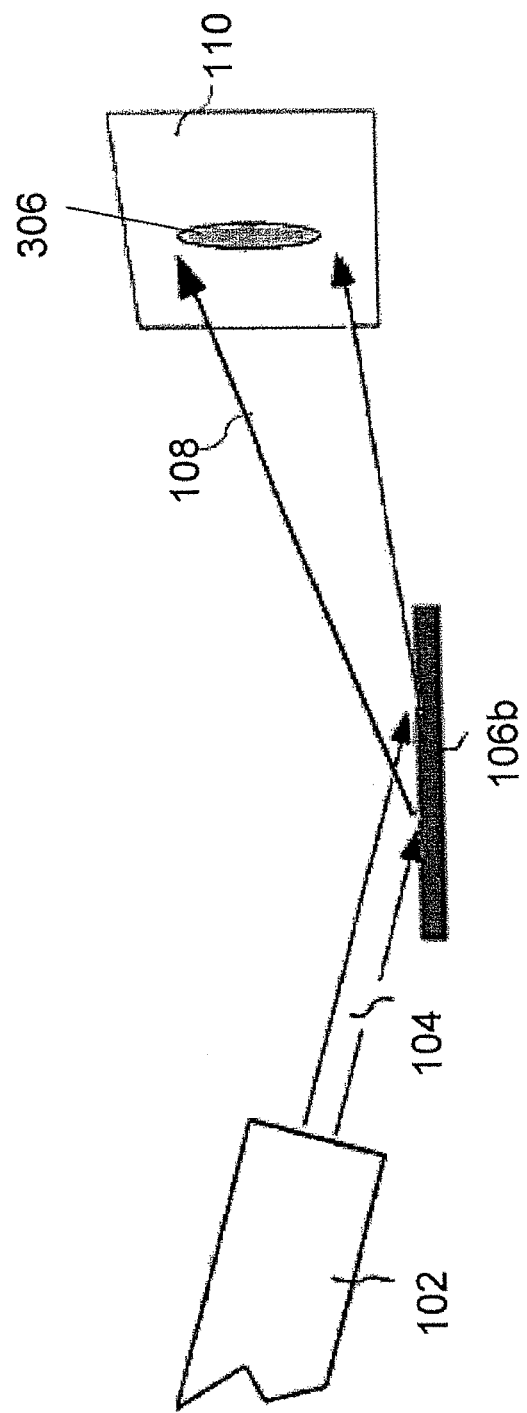

Referring to FIGS. 3A-C, diffuser 106 is shown as a reflective diffuser 106b. Reflective diffuser 106b can be, but is not limited to, mirrors, reflective surfaces, and highly reflective surfaces. Further, in some embodiments, reflective diffuser 106b can be shaped, such as, but not limited to, concave, convex, flat, spheroid, conical, any multisided geometric shape, or any other shape deemed suitable. For example, referring to FIG. 3A, reflective diffuser 106b includes a concave surface capable of modifying light 104 to light 108 creating desired pattern 302 on surface 110. Further, referring to FIG. 3B, reflective diffuser 106b includes a convex surface capable of modifying light 104 to light 108 creating desired pattern 304 on surface 110. Further still, referring to FIG. 3C, reflective diffuser 106b includes a flat surface capable of modifying light 104 to light 108 creating desired pattern 306 on surface 110.

Although reflective diffuser 106b is illustrated as a single diffuser, in some embodiments, multi-diffusers (e.g., multiple reflective diffusers) can be used to create the desired pattern on surface 110. Further, in some embodiments, the size and shape of the desired pattern can be modified by changing the angle of deflection off of reflective diffuser 106b. Further still, in some embodiments any combination of at least one reflective diffuser and at least one lens diffuser can be used, alone or in combination, to create the desired pattern on surface 110.

In some embodiments, laser light source 102 can be selected based on a particular wavelength or frequency interval of light generated by it. This may be done to increase illumination of a surface for viewing by selecting a wavelength interval or frequency interval based on the color of the surface for viewing or a specific region on the surface for viewing. For example, the laser light source can be selected to produce red light (e.g., 700-635 nm wavelength interval 430-480 THz frequency interval), orange light (e.g., 635-590 nm wavelength interval 480-510 THz frequency interval), yellow light (e.g., 590-560 nm wavelength interval 510-540 THz frequency interval), green light (e.g., 560-490 nm wavelength interval 540-610 THz frequency interval), blue light (e.g., 490-450 nm wavelength interval 610-670 THz frequency interval), violet light (e.g., 450-400 nm wavelength interval 670-750 THz frequency interval) or any combination thereof based on the color emitted by the laser light source and the color of the surface for viewing. For example, a laser light source capable of emitting green coherent light may be selected for a red stop sign.

Figure 4A:
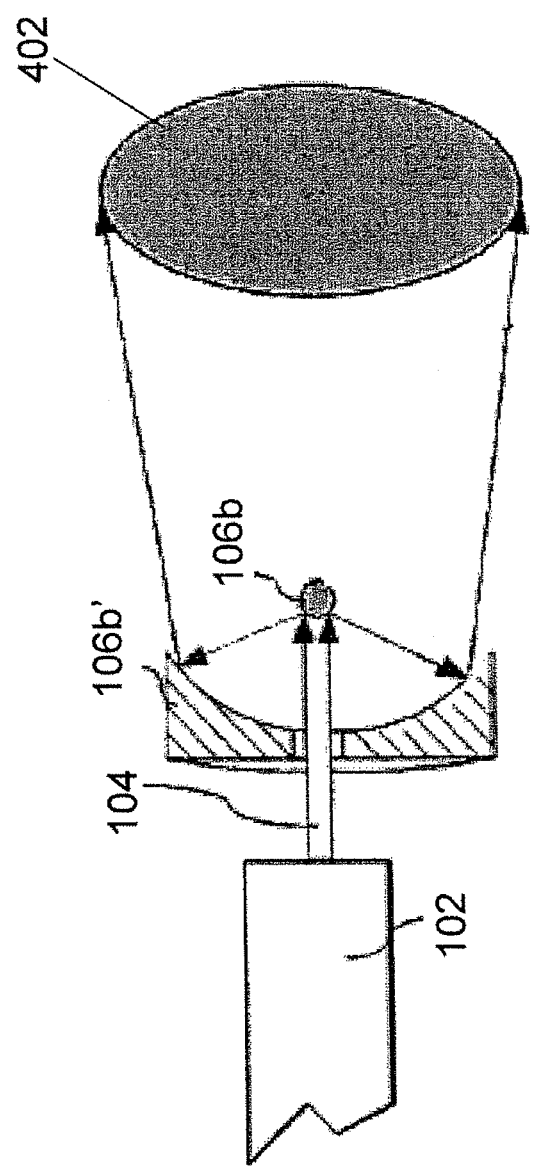
FIGS. 4A-B are side view illustrations of an illumination system using multiple diffusers according to an aspect of the invention.
Figure 4B:
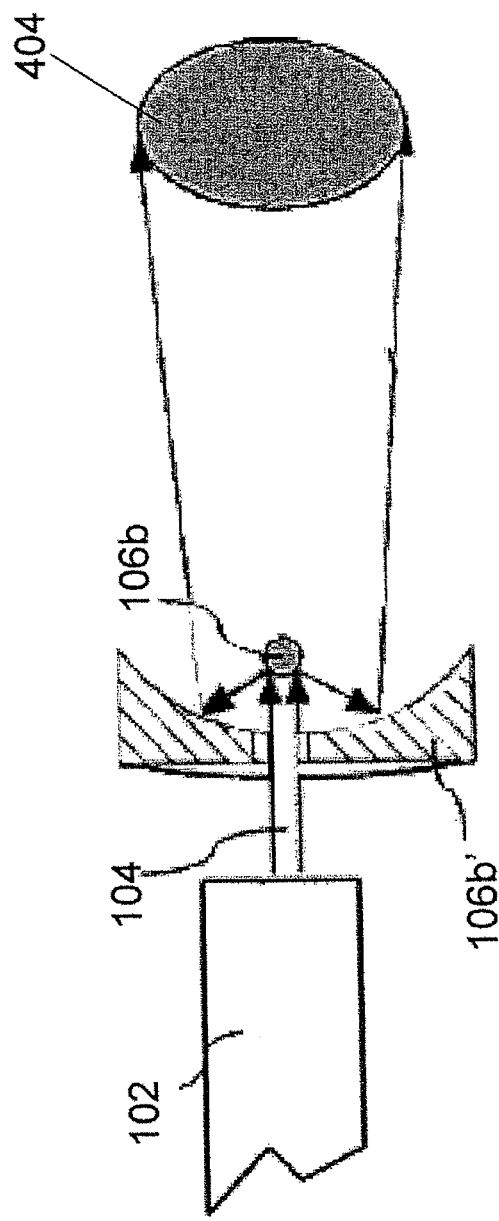

In some embodiments, the desired pattern can be created by a plurality of diffusers capable of moving relative to each other. Referring to FIGS. 4A-B, a first reflective diffuser 106b moves relative to a second reflective diffuser 106b'. Moving a plurality of diffusers is not limited to linear motion, only moving one diffuser, or only two diffusers. Rather, in effort to ease understanding, FIGS. 4A-B illustratively depicts a simple linear movement of a first reflective diffuser 106b relative to a second reflective diffuser 106b'.

Further, although described as reflective diffusers, any type of diffuser can be used to create the desired pattern. For example, FIGS. 4A-B depicts a spheroid/columnar reflective diffuser and a concave reflective diffuser. Alternatively, any plurality of shapes can be used as diffusers. Further, in some embodiments, moving a plurality of diffusers relative to each can be accomplished by any technique, such as, but not limited to, mechanically motion (e.g., piston/cylinder, screw/thread, etc.), electromechanically motion (e.g., electric motor driven, etc.), electromagnetically driven motion, or by any other technique deemed suitable.

Referring to FIG. 4A, first reflective diffuser 106b is located at an initial offset from second reflective diffuser 106b' creating a first desired pattern 402 on surface 110 (not shown). Referring to FIG. 4B, the offset between first reflective diffuser 106b and second reflective diffuser 106b' is decreased creating a second desired pattern 404 on surface 110 (not shown).

In some embodiments, after passing through or reflective off of the diffuser, the light can be further shape modified. This shape modification may be required, for example, to cleave the light or block the light prior to illuminating a surface for viewing. There are many benefits to shape modifying the light, such as, but not limited to, eliminating any safety risk created by having excessive light outside of a surface for viewing or to outline a region of a surface for viewing.

Figure 5A:
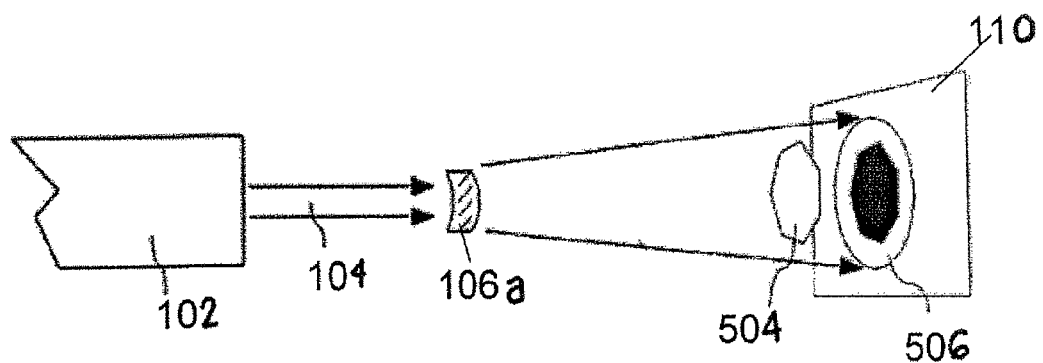
FIGS. 5A-B are side view illustrations of an illumination system using shape modifiers for creating a desired pattern according to an aspect of the invention.
Figure 5B:
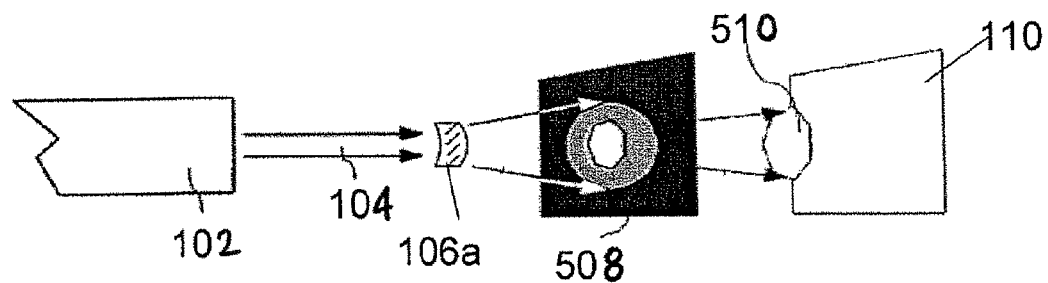

For example, referring to FIGS. 5A-B, light 104 emitted from laser light source 102 can be shape modified to a desired pattern. As shown in FIG. 5A, after light 104 interacts with lens diffuser 106a at least some of the light can be blocked by a shield 504 thereby creating a shape modified desired pattern 506 on surface 110. As shown, the shape modified desired pattern 506 illustratively depicted in FIG. 5A is round with an empty (i.e., lightless) polygon (e.g., heptagon) center. Further, as shown in FIG. 5B, after light 104 interacts with lens diffuser 106a at least some of the light can be cleaved by an aperture like device 508 thereby creating a shape modified desired pattern 510 on surface 110. Although shape modifying is described as occurring after the light exits a lens diffuser this is by way of example only. Shape modifying can occur before or after laser light exits or enters any of a single diffuser or a plurality of diffusers. Further, although illustratively depicted as a lens diffuser, any diffuser can be used.

As described below in greater detail, in some embodiments, for illuminating a substantially large surface for viewing a desired pattern may be scanned. Scanning can be accomplished by any suitable technique. Scanning techniques may include the use of a static laser, a dynamic laser, a static diffuser, a dynamic diffuser, or any combination thereof alone. Therefore, scanning techniques using a dynamic laser and/or a dynamic diffuser may incorporate a mechanical, electromechanical, electromagnetic, or robotic device for moving any of the dynamic laser, the dynamic diffuser, or any combination thereof. Accordingly, in some embodiments, scanning/moving can be accomplished by any suitable technique, such as, but not limited to, a crank extending from a motor; electromagnetic induction causing a magnet to move; a cartesian robot; a gantry robot; a cylindrical robot; spherical/polar robot; a SCARA robot; an articulated robot; and a parallel robot.

Referring to FIGS. 6A-B, as discussed above, a desired pattern 602/606 can be scanned through a predetermined path 604/608 on surface 110. For example, scanning through the predetermined path may be performed so rapidly that one viewing the surface would not see a small illuminated portion being scanned across the screen, but would rather perceive the entire viewing surface as illuminated.

In some embodiments, the desired pattern is raster scanned through a predetermined path. The predetermined path can be any path, such as, but not limited to, a snake like path, an S pattern, spiral pattern, horizontal pattern, vertical pattern, horizontal and vertical pattern, a random pattern, or any other pattern deemed suitable. Further, in some embodiments, as depicted by contrasting FIG. 6A to FIG. 6B, a proportional relationship exists between the desired pattern 602/606 and predetermined path 604/608. Thus, in some embodiments, the scanning technique can be predicated on a scanning velocity, the size of surface 110, the desired pattern's (and/or shape modified desired pattern's) shape and size, the predetermined path, and/or the combination of at least one laser light source.

In some embodiments, the scanning technique can be predicated on the reflectivity of a surface for viewing. For example, referring to FIGS. 7A-B, surface 110 can have differing levels of reflectivity. By comparing FIG. 7A to 7B the interaction between reflectivity of surface 110 and the techniques for illuminating surface 110 becomes apparent. For example, surface 110 in FIG. 7A has a substantially lower level of reflectivity than surface 110 in FIG. 7B, which includes a plurality reflective beads 702. Thus, in some embodiments, the scanning technique can be predicated on the scanning velocity, the reflectivity of surface 110, the size of surface 110, the desired pattern's (and/or shape modified desired pattern's) shape and size, the predetermined path, and/or the combination of at least one laser light source. Accordingly, illuminating a surface for viewing can be accomplished by many various techniques based on any of the above factors. Scanning may also be used to form an image of a predetermined shape. Additionally, scanning may be used to effectively project a wide-angle light for the purpose of lighting large target surfaces in close proximity, to limit light bleeding past the edge of a target, to shape the projected light to correspond the shape of the target surface, or to change a color of the projected light throughout the scan (e.g., to coincide with a color of the target surface).

Scanning may be performed using motors, electromagnetic motion, or any other mechanism for moving the projected light on the target surface. Preferably, such mechanism would be capable of moving the projected light on the target surface quickly enough that the scan pattern would not be perceived. Thus, for example, an actuator used for scanning may implement a mechanical, electromechanical, electromagnetic, or robotic device for moving any one of a laser, a diffuser, or any combination thereof. Further examples include a crank extending from a motor, electromagnetic induction causing a magnet to move, a cartesian robot, a gantry robot, a cylindrical robot, spherical/polar robot, a SCARA robot, an articulated robot, and a parallel robot. In some instances, this scanning/moving can be computer controlled (e.g., using a microprocessor) and scanning/moving can be based on any of the above factors.

To ease understanding of the disclosed subject matter, below are a few examples of how scanning/moving can be accomplished. However, it is envisioned that any number of alternative scanning techniques can be used without deviating from the scope of the disclosed subject matter. Further, any of the techniques described below can be used alone or in combination to move/scan any one of at least one laser, at least one diffuser, or any combination thereof alone or in conjunction.

Figure 8A:
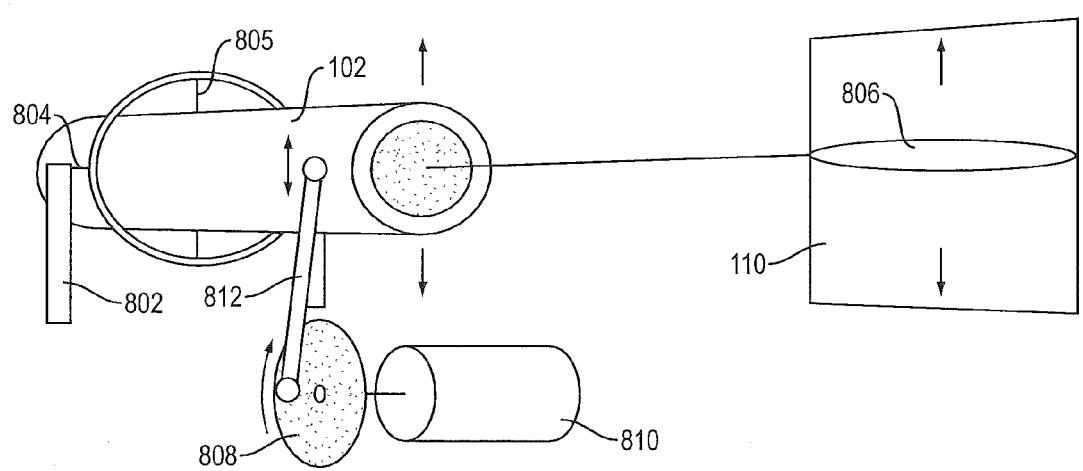
FIGS. 8A-C are schematic diagrams of dynamic lasers illuminating a surface for viewing according to an aspect of the invention.
Figure 8B:
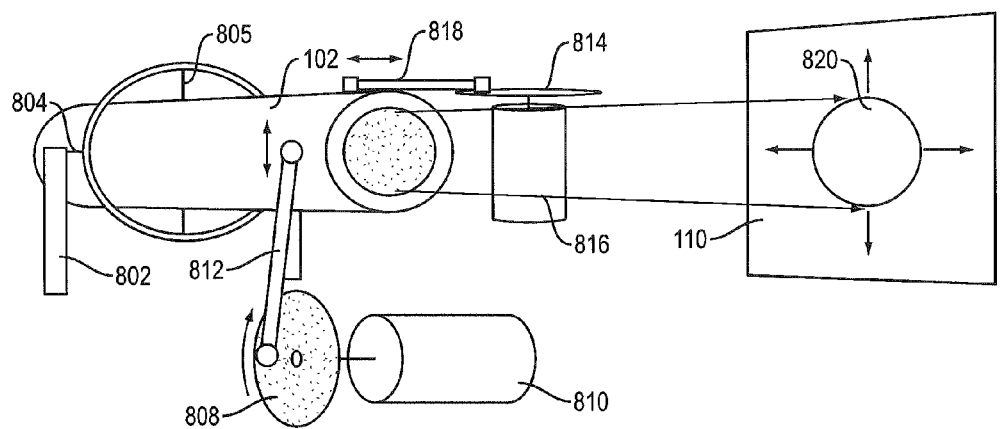
Figure 8C:
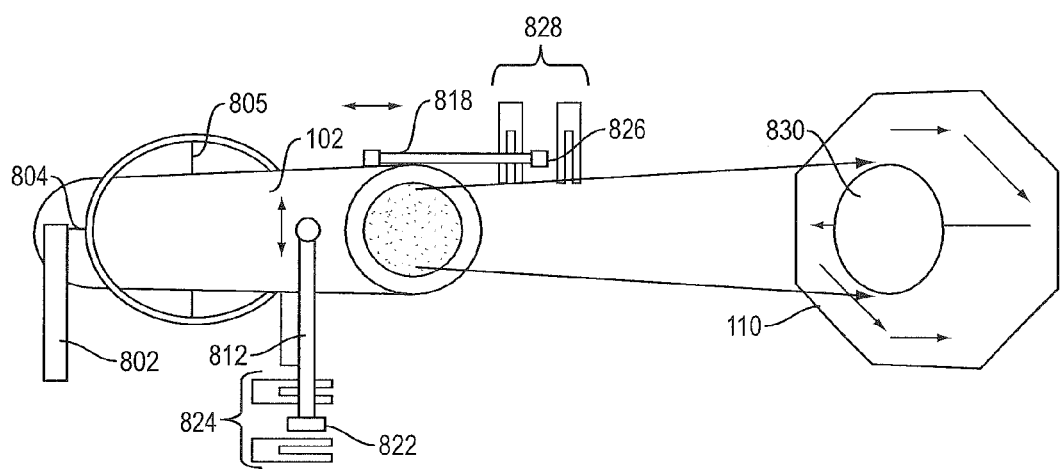

Referring to FIGS. 8A-C, in some embodiments, a dynamic laser light source can be used for illuminating a surface for viewing. While FIGS. 8A-C do not illustrate a diffuser, it should be understood that a diffuser may be added to these embodiments to produce a desired shape, as discussed above.

Referring to FIG. 8A, a dynamic laser light source is mechanical moved in a vertical axis in accordance with some embodiments of the disclosed subject matter. As depicted, laser light source 102 can be mounted in a gimbal style mount 802 having a horizontal axis stand 804 and a vertical axis stand 805. This mount allows movement of laser light source 102 on a horizontal and vertical axis or movement in any angle desired. Although described as a gimbal style mount, laser light source 102 can be mounted in a ball and socket type mount or any type of mount that allows for movement in one or two axis or in any angle desired. As shown, laser light source 102 uses a diffuser (not shown) creating a desired pattern 806 (e.g., a substantially ovoidal pattern) that is scanned along a predetermined path (i.e., up and down a vertical path). Scanning up and down a vertical path with an ovoidal desired pattern illuminates surface 110.

In some embodiment, vertical movement of laser light source 102 can be induced by a first crank 808 driven by a first motor 810 with a first fixator 812 located at an offset from the center of first crank 808. As first fixator 812 connects at one end to first crank 808 and at the other end to laser 102, when first crank 808 rotates first fixator 812 drives laser 102 up and down along a vertical axis.

Referring to FIG. 8B, in some embodiments, horizontal movement can be induced by a second crank 814 driven by a second motor 816 where a second fixator 818 is located at an offset from the center of second crank 814. As second fixator 818 connects at one end to second crank 814 and at the other end to laser 102, when second crank 814 rotates second fixator 818 drives laser 102 back and forth along a horizontal axis. In some instances, laser light source 102 uses a diffuser (not shown) creating a desired pattern 820 (e.g., a substantially round pattern) that can be scanned along a predetermined path (i.e., back and fourth along a horizontal path) illuminating surface 110.

Still referring to FIG. 8B, in some embodiments, vertical and horizontal movement of the laser can be combined. That is, as vertical movement of laser light source 102 is induced by first crank 808 driven by first motor 810 with first fixator 812 located at an offset from the center of first crank 808; horizontal movement is also induced by second crank 814 driven by second motor 816 with second fixator 818 located at an offset from the center of second crank 814. This combination can allow for any movement of desired pattern 820 through any predetermined path on surface 110.

Referring to FIG. 8C, in some embodiments, vertical and horizontal movement of the laser is driven by electromagnetic induction. For example, first fixator 812 can be attached to laser 102 at one end and at a second end can include a first magnet 822 housed in an electromagnetic device 824 capable of varying polarity (i.e., magnetic polarity). By varying polarity first magnet 822 can move in a first and second direction driving first fixator 812 up and down along a vertical axis. Further, second fixator 818 can be attached to laser 102 at one end and at a second end can include a second magnet 826 housed in an electromagnetic device 828 capable of varying polarity. By varying polarity second magnet 826 can move in a first and second direction driving second fixator 818 back and forth along horizontal axis.

Further, in some embodiments, vertical and horizontal movement of the laser controlled by electromagnetic induction can be combined. For example, as vertical movement is driven by first fixator 812 attached to laser 102 at one end and at a second end including first magnet 822 housed in electromagnetic device 824 capable of varying polarity; horizontal movement is driven by second fixator 818 attached to laser 102 at one end and at a second end including second magnet 826 housed in electromagnetic device 828 capable of varying polarity. As shown, this combination of vertical and horizontal movement allows a desired pattern 830 to scan through a predetermined path thereby illuminating surface 110. Further, as shown in FIG. 8C surface 110 can, as described above, be any shape thus desired pattern 830 may be required to scan through a substantially complex predetermined path for illuminating surface 110.

Referring to FIGS. 9A-D, at least one dynamic diffuser can be moved in accordance with some embodiments of the disclosed subject matter. As described above, diffusers can be moved by any technique deemed suitable for producing controlled movement. Electromagnetic induction for moving a reflective diffuser is described with respect to FIGS. 9A-B. A mechanical technique for moving a reflective diffuser is described with respect to FIGS. 9C-D. However, any technique deemed suitable for producing controlled movement of a diffuser can be used without deviating from the scope of the disclosed subject matter. For example, it should be understood that the diffusers depicted in FIGS. 9A-D are not limited to reflective diffusers. Further, one or more lens diffusers may be dynamic. Even further, any additional diffuser can be positioned at any location before/after interacting with a first diffuser and/or before/after any plurality of diffusers.

Figure 9A:
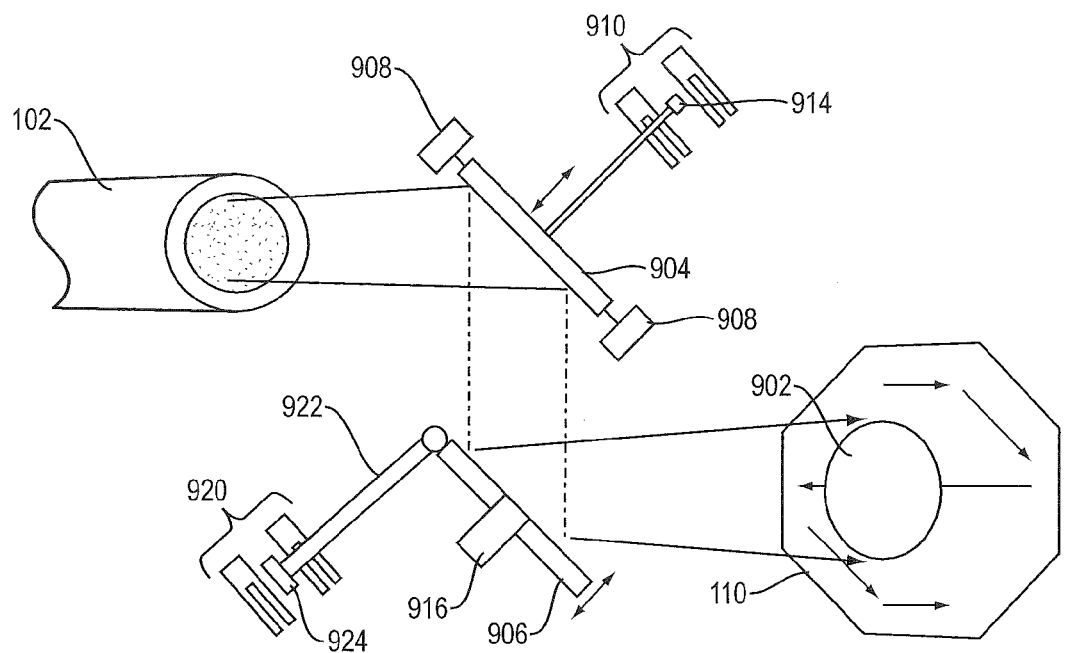
FIGS. 9A-D illustrate an illumination system using dynamic diffusers according to an aspect of the invention.

Referring to FIG. 9A, in accordance with some embodiments, desired pattern 902 can be scanned on surface 110 by moving a plurality of reflective diffusers (i.e., dynamic reflective diffusers). The dynamic reflective diffuser can be any form of diffuser previously described and can be moved by any technique deemed suitable. As shown, the reflective diffusers movement can be driven by electromagnetic induction. For example, laser light source 102 can be statically mounted and the laser light can interact with a first dynamic reflective diffuser 904. First dynamic reflective diffuser 904 can be a reflective surface capable of moving by, for example, using a bearing assemblies 908, an electromagnetic device 910, and a first fixator 912 including a first magnet 914. As shown first fixator 912 can be centrally attached to first dynamic reflective diffuser 904. In use, first dynamic reflective diffuser 904 can be driven by first dynamic fixator 912 centrally attached to first dynamic reflective diffuser 904 at one end and at a second end including first magnet 914 housed in electromagnetic device 910 capable of varying polarity. As the polarity changes first dynamic reflective diffuser 904 can be driven in a first and second direction while, for example, being guided by bearing assemblies 908. Further, after interacting with first dynamic reflective diffuser 904 the laser light can further interact with a second dynamic reflective diffuser 906.

By way of example, second dynamic reflective diffuser 906 can be driven by electromagnetic induction. For example, after interacting with first dynamic reflective diffuser 904, laser light can interact with second dynamic reflective diffuser 906. Second dynamic reflective diffuser 906 can be a reflective surface capable of moving by, for example, using a second bearing assembly 916, a second electromagnetic device 920, and a second fixator 922 including a second magnet 924. As shown, second fixator 922 can be attached to second dynamic reflective diffuser 906 at an offset from second bearing assembly 916. In use, second dynamic reflective diffuser 906 can be driven by second fixator 922 attached to second dynamic reflective diffuser 906 at one end and at a second end including second magnet 924 housed in second electromagnetic device 920 capable of varying polarity. As the polarity changes second fixator 922 can be driven in a first and second direction causing second dynamic reflective diffuser 906 to move at an angle relative to the offset from second bearing assembly 916. The combination of first dynamic reflective diffuser 904 moving and second dynamic reflective diffuser 906 moving scans desired pattern 902 on surface 110 through a predetermined path.

Figure 9B:
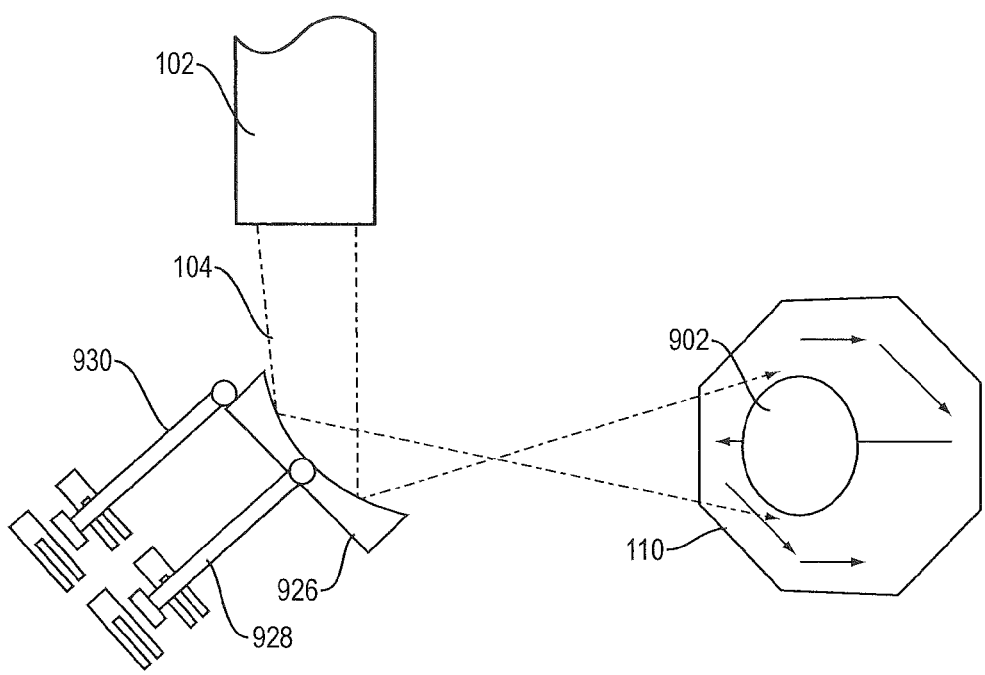

Referring to FIG. 9B, in accordance with some embodiments, desired pattern 902 can be scanned on surface 110 by a single dynamic reflective diffuser 926. Single dynamic reflective diffuser 926 can be mounted in, for example, a gimbal or any other style mount that allows for multi axis movement. As shown, single dynamic reflective diffuser 926 can include a shaped surface (e.g., concave surface). Further, single dynamic reflective surface 926 can be moved by a first and second fixator 928, 930. By way of example, first and second fixator 928, 930 can be moved by any of the techniques previously mentioned, such as, electromagnetic induction. Further, as shown, the location of first and second fixator 928, 930 can vary driving single dynamic reflective diffuser 926 in more than one direction. Driving single reflective diffuser 926 in more than one direction scans desired pattern 902 through a predetermined path on surface 110.

Figure 9C:
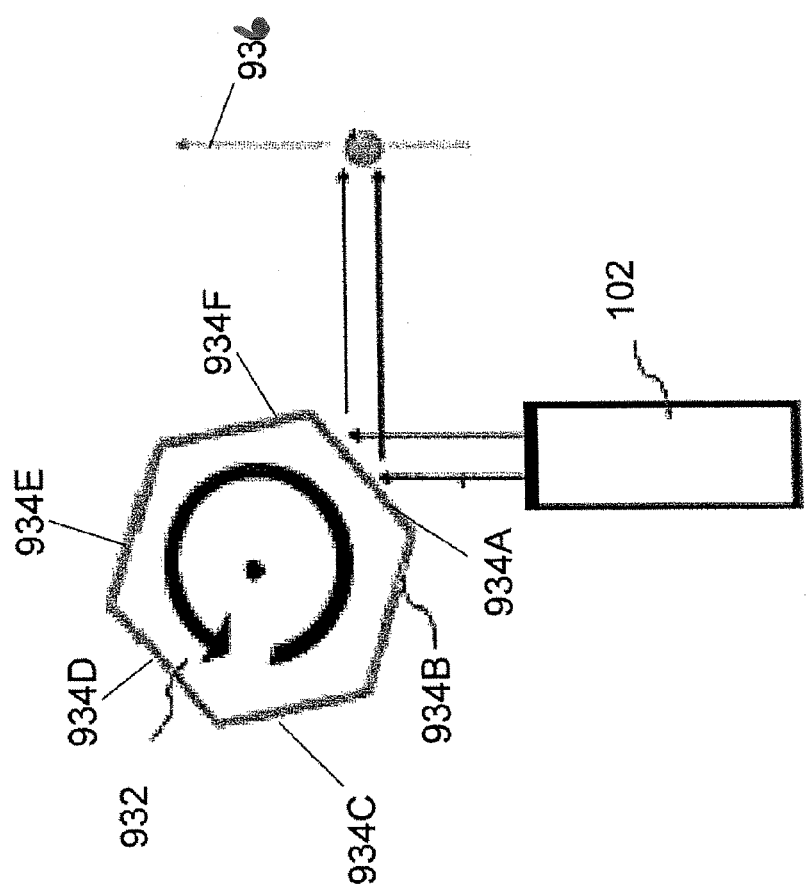

Referring to FIG. 9C, scanning can be accomplished by rotating a dynamic reflective diffuser 932 having multiple reflective surfaces 934A-F in accordance with some embodiments of the disclosed subject matter. As shown, dynamic reflective diffuser 932 can have a hexagon columnar shape capable rotating about its center axis. As dynamic reflective diffuser 932 rotates, each of reflective surfaces 934A-F reflects the laser light thereby scanning in a first direction 936. That is, unlike the previous techniques of scanning, this allows for repeated scanning in a single first direction only.

Figure 9D:
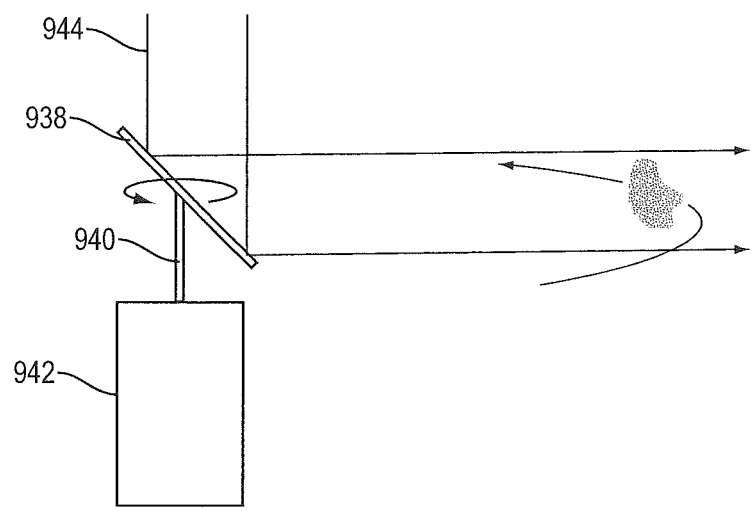

Referring to FIG. 9D, a dynamic reflective diffuser 938 can be mounted on an angle to a shaft 910 of a motor 942. In use, as dynamic reflective diffuser 938 rotates laser light 944 reflects thereby scanning through 360 degrees.

Figure 10:
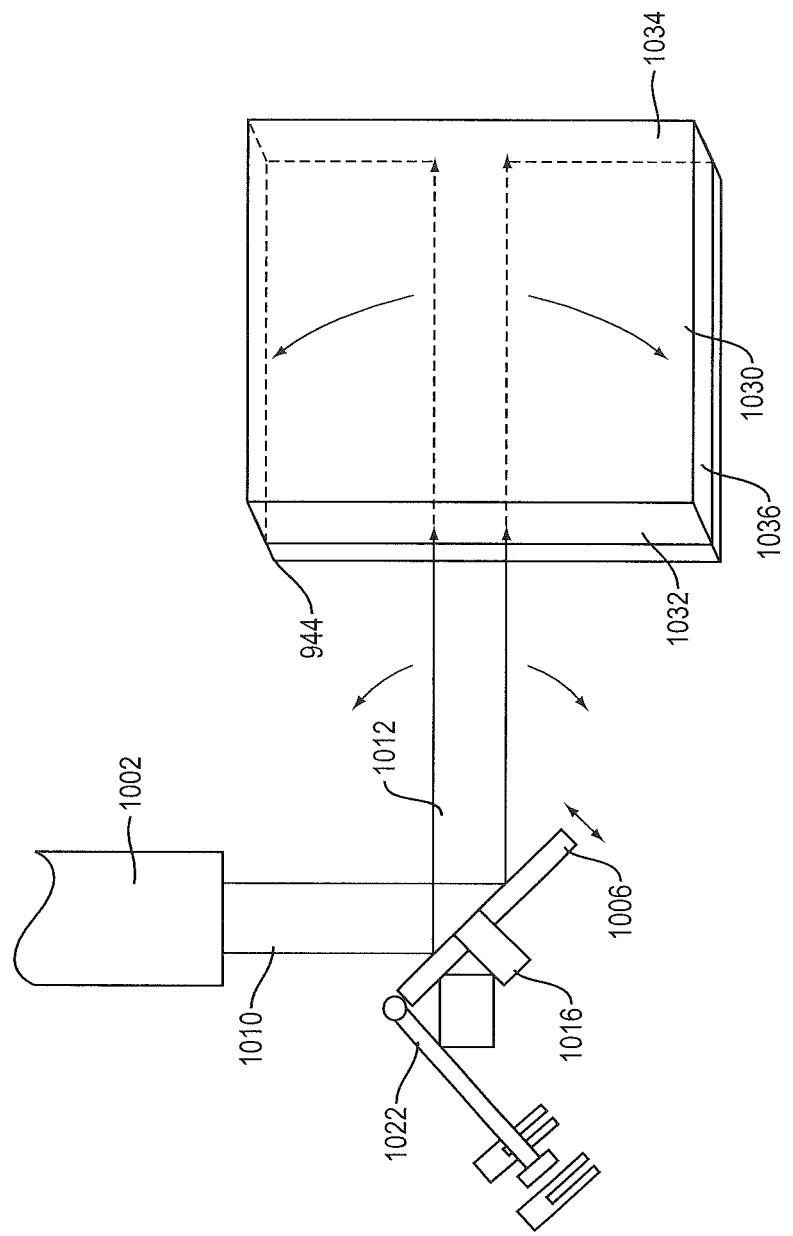
FIG. 10 illustrates illumination of a panel using an illumination device according to an aspect of the invention.

FIG. 10 illustrates an aspect of the invention where the illuminator is used to illuminate a panel 1030. Illumination may be performed using a semi coherent scanning beam method. A coherent or semi-coherent beam 1010 may be projected from source 1002 and reflected off a reflective surface 1006 of an actuator 1022. The reflected beam 1012 may pass through an edge 1032 of the panel 1030. The actuator 1022, or the reflective surface 1006 thereof, may move in any of a number of directions, thereby enabling scanning of the reflected beam 1012 throughout the panel 1030. For example, the reflective surface 1006 may pivot back and forth on an access point 1016, thereby causing the projected beam 1010 to reflect at various angles. Accordingly, the reflected beam 1012 may scan back and forth across an edge 1032 of the panel 1030. Such scanning may be performed at a rate which is fast enough that the beam itself is not detected by a human eye. Rather, the eye will perceive the entire panel 1030 as being illuminated.

According to one aspect, the edge 1032 of the panel 1030 may be milled in an angle, curve, or both to act as a lens to diffuse and redirect the reflected beam 1012 to another surface of the panel 1030. For example, as shown in FIG. 10, the edge 1032 is milled in a concave shape, thus facilitated the spreading of the beam within the panel 1030.

According to a further aspect, the panel 1030 may include a coating along other edges, through which the reflected beam 1012 does not pass. For example, edges 1034, 1036 may be coated with a bright or reflective material to reflect light in any or many directions within the panel 1030. In addition the edges that are coated can be milled in any angle or curve to further diffuse light within the panel 1030.

Figure 11:
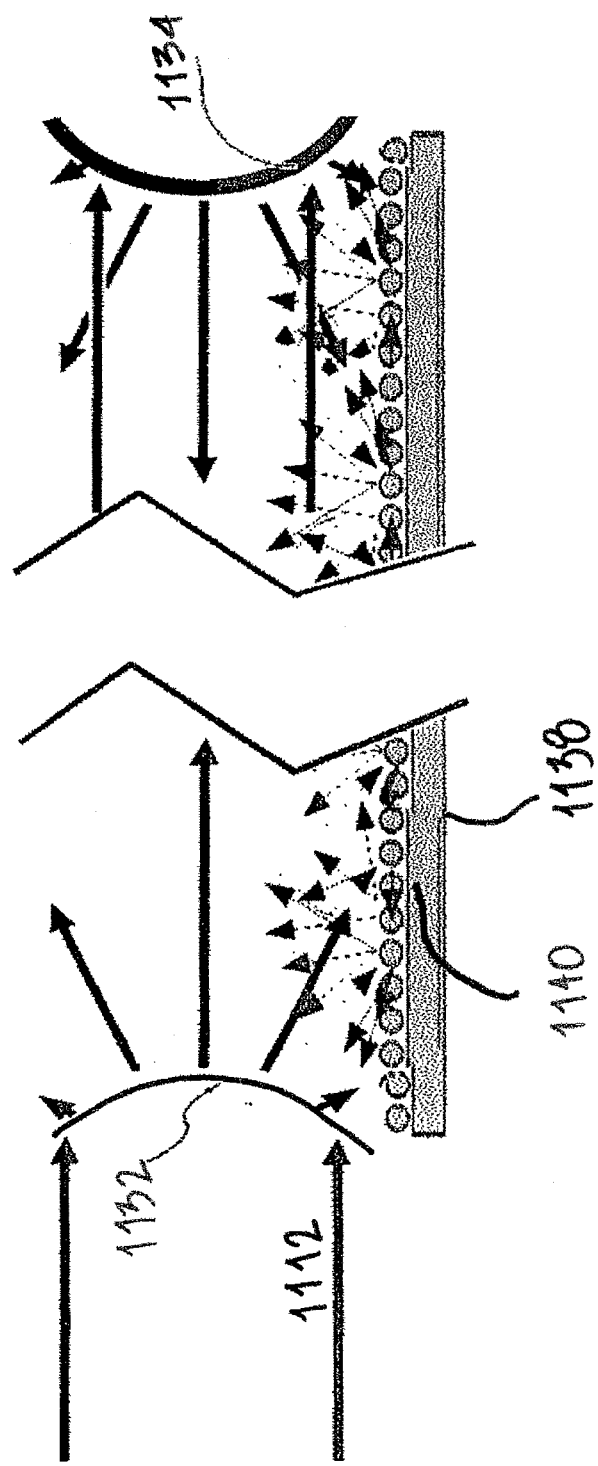
FIG. 11 is a detailed cross-sectional view of a surface of an illuminated panel according to an aspect of the invention.

A back side of the panel 1030 may be covered with a bright surface or a high reflective material that uses microscopic bead or grains to further defuse and reflect light, as illustrated in FIG. 11. For example, as reflected beam 1112 passes through edge 1132 of a panel, the beam 1112 is diffused in many different directions. Because an edge 1138 of the panel is coated with grains 1140, light is refracted off the grains 1140 and back into the panel, rather than passing through the panel. Additionally, light passing through edge 1132 which travels to an opposing edge 1134 may be reflected off the edge 1134 and dispersed because of the convex shape. Such reflection and dispersion may facilitate illumination by spreading light throughout the panel.

Figure 12:
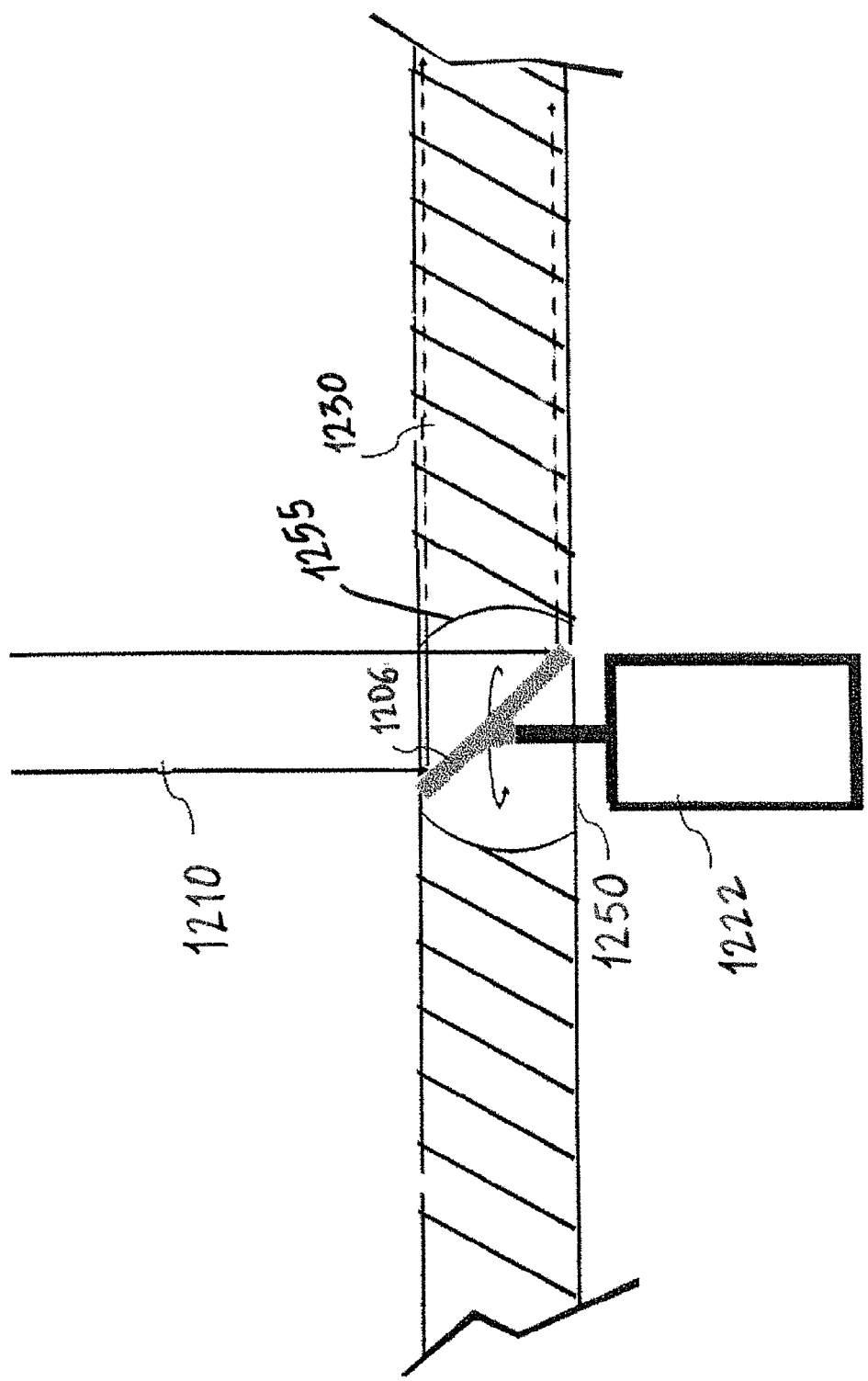
FIG. 12 is a system for illuminating a panel according to an aspect of the invention.

FIG. 12 illustrates illumination of a panel 1230 using a light beam 1210 reflected off a reflective surface 1206 of an actuator 1222. The actuator 1222 may cause the reflective surface 1206 to rotate about an axis. As the reflective surface 1206 is rotated, light 1210 may be reflected to different portions of the panel 1230. The actuator 1222 may include miniature motors or the like which enable it to rotate the reflective surface 1206. According to one aspect, the reflective surface may rotate 360 degrees from a location within the panel. For example, the panel 1230 may include a bore 1250 near its center, and the reflective surface 1206 may be positioned in the bore 1250 so as to distribute light relatively evenly throughout. Thus, for example, the light beam 1210 may reflect off the reflective surface 1206 at a right angle through the panel 1230. As the motor rotates the reflective surface 1206, the beam is reflected 360 degrees around through an edge 1255 of the bore 1250 and into the panel 1230. According to one aspect, the edge 1255 of the panel adjacent the bore 1255 may be curved to facilitate the distribution of light within the panel 1230. The edge 1255 may also be cut to an angle, curve, or both, that will achieve any desired effect.

Figure 13:
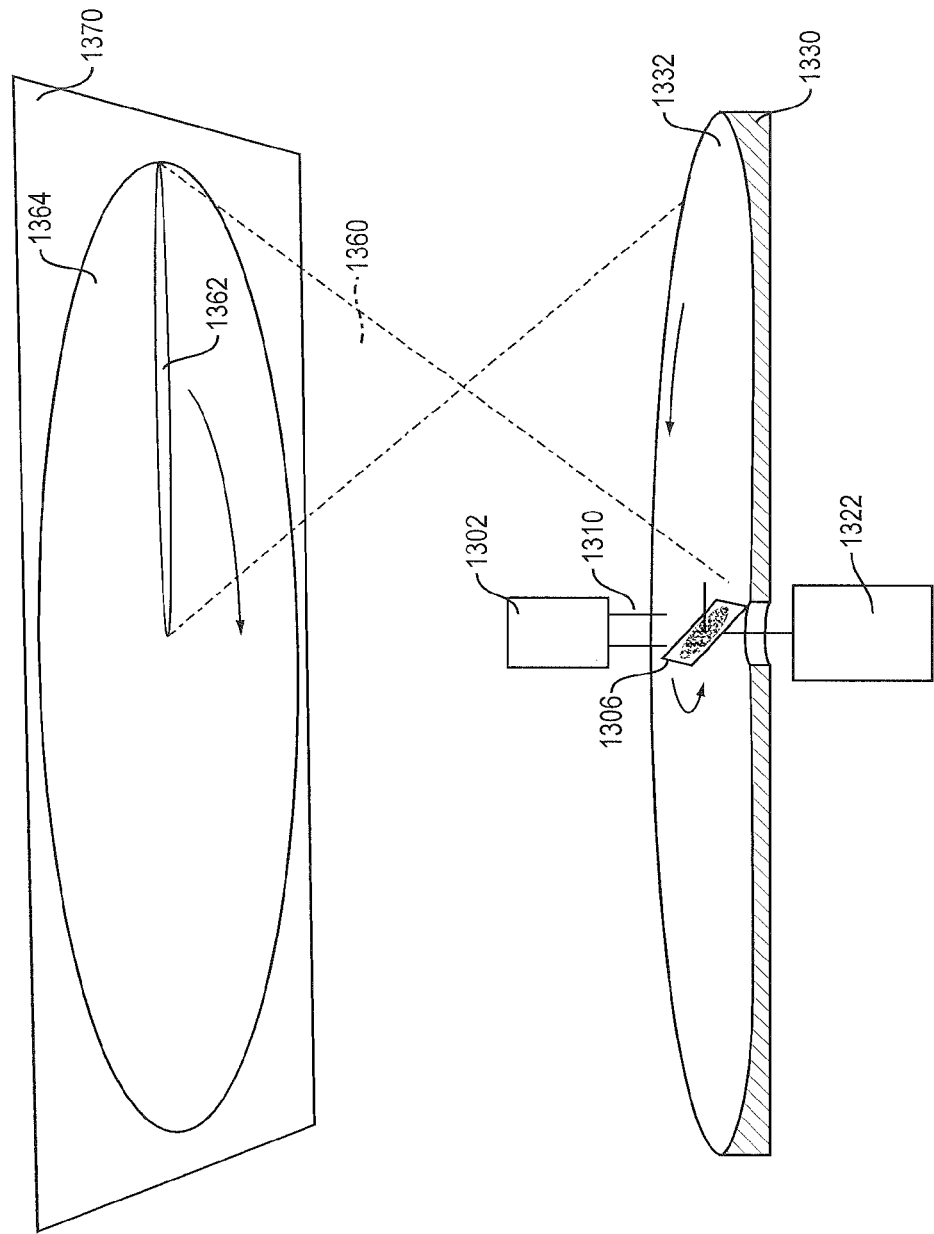
FIG. 13 is a system for illuminating a panel according to another aspect of the invention.

FIG. 13 represents another embodiment, wherein a reflective surface 1306 positioned within a panel 1330 may be rotated by an actuator 1322 to spread light 1310 from a source 1302 around the panel. In this embodiment, the reflective surface 1306 is positioned above the panel 1330. Additionally, the panel 1330 has a top surface 1332 which is milled to a wedge shape. The top surface 1332 may be coated with a reflective coating, so that light is further reflected onto an illumination panel 1370. As shown in the illustration, the shape of the top surface 1332 causes reflected beams 1360 to produce an oval shape 1362 on the illumination panel 1370. As the reflective surface 1306 is rotated, thereby scanning light across the entire top surface 1332, the reflected beams 1360 will produce an image 1364 in the shape of a larger oval. Accordingly, the illumination panel 1370 is "backlit" by light source 1302 and the panel 1330 to produce a particular image 1364.

Figure 14:
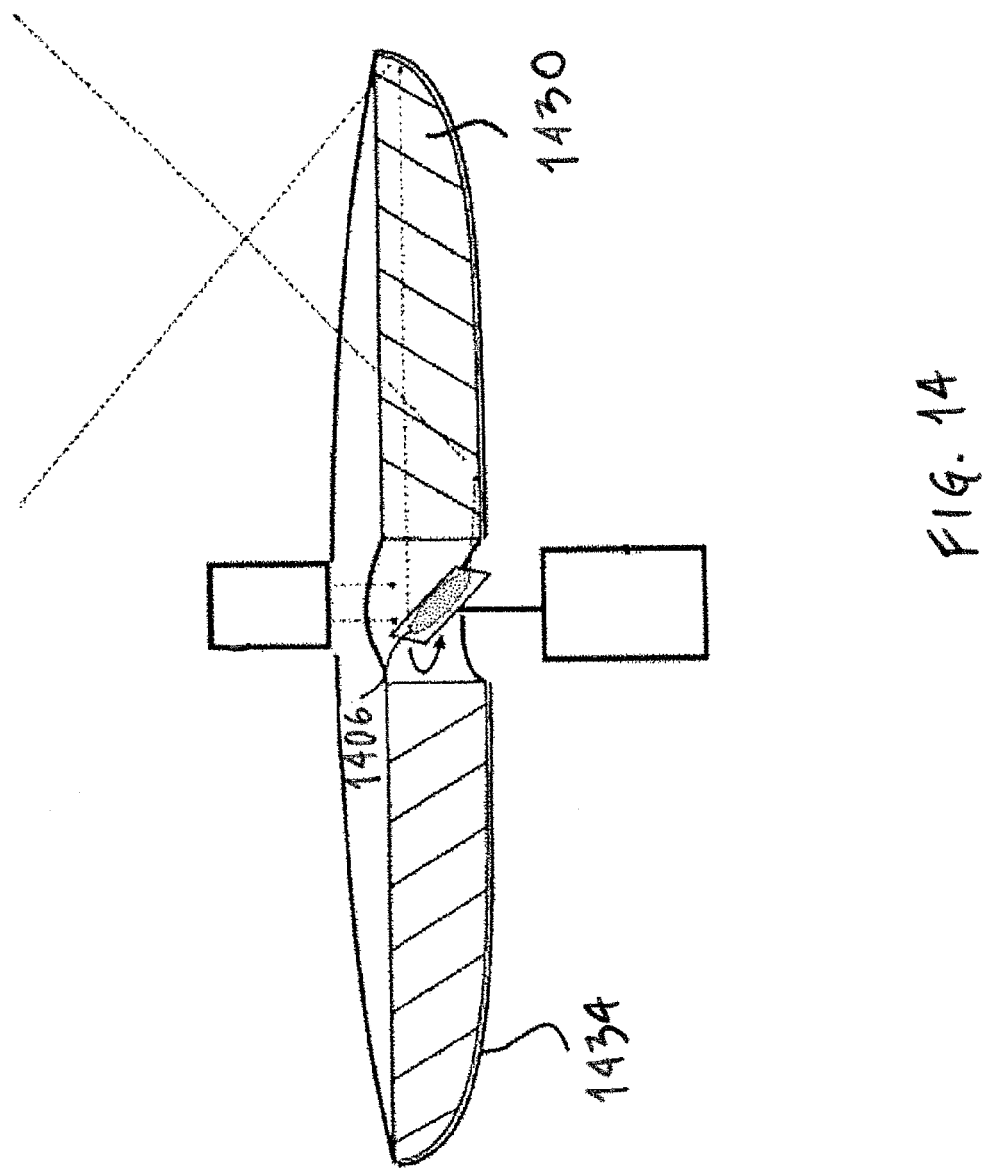
FIG. 14 is a system for illuminating a panel according to another aspect of the invention.

As illustrated in FIG. 14, backlighting may be achieved using a panel 1430 having a curved bottom surface 1434. The bottom surface may be coated with a reflective coating. Reflective surface 1406 may be positioned within a bore in the panel 1430 to reflect light throughout the panel. The light may be reflected off the coated bottom surface 1434, and the reflected beams may project onto an illumination panel (not shown) to form an image. Thus, backlighting is achieved while the bottom surface 1434 of the panel 1430 is protected from weather elements etc.

Figure 15A:
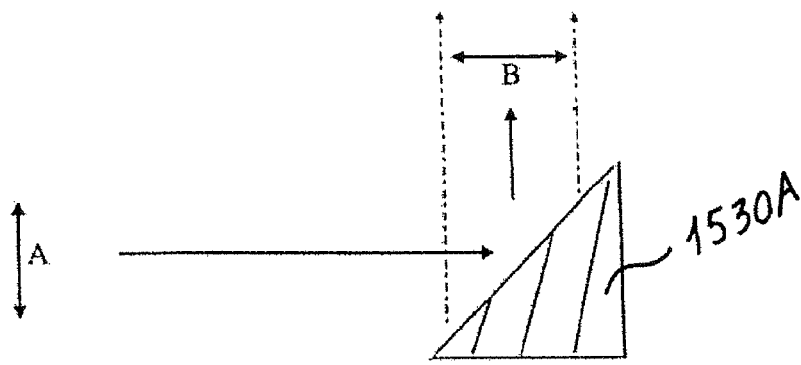
FIGS. 15A-15C illustrate various panel surfaces in an illumination system according to an aspect of the present invention.
Figure 15B:
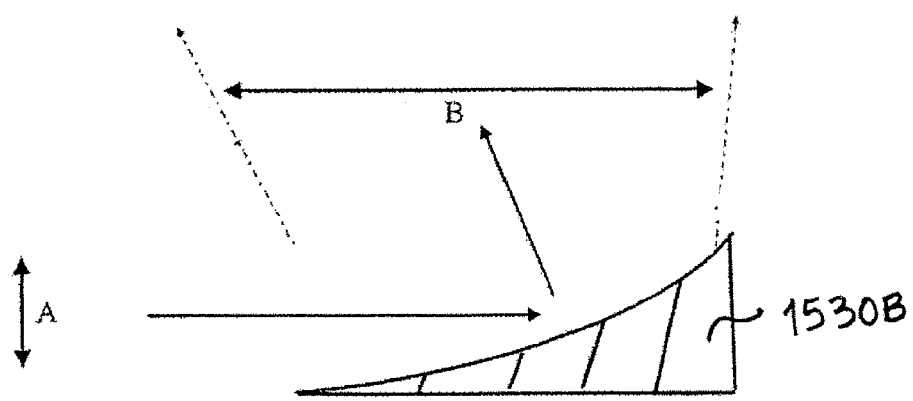
Figure 15C:
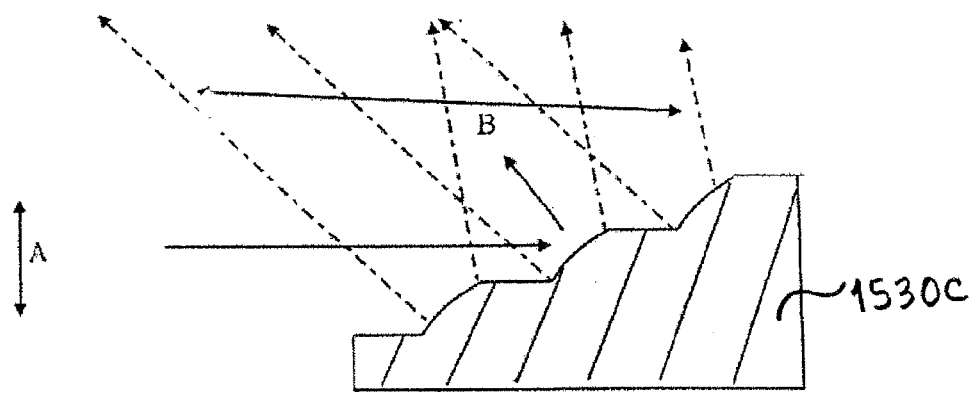

Backlighting may be achieved using a panel of any of a variety of shapes or materials. For example, FIGS. 15A-15C shows portions of panels 1530A, 1530B, and 1530C having different shapes. Panel 1530A includes a slop at an angle such that light may be reflected at approximately 90 degree angles. Panel 1530B is shaped in a concave manner to cause diffusion of light projected thereon. Panel 1530C includes a surface having multiple angles. This allows for a beam to be reflected across a larger panel surface by separating the convex angles with horizontal areas running between them and in parallel with the coherent light in a stair step fashion. A defused coherent light source can also be used if the light from the coherent source is not thick enough to engulf the ground angles in the panel.

It should also be understood the that reflective surface may be positioned anywhere within the panel (e.g., closer to an edge, in the center, below the panel, etc.), may be adjusted to reflect light at any of a variety of angles, and may move in a number of different directions. For example, the reflective surface may be continually repositioned at different angles during the scanning process. Additionally, the reflective surface may oscillate back and forth to scan a panels edge, as opposed to rotating 360 degrees. Even further, it should be understood that the panel 1330 may be moved relative to the illumination panel 1370 to vary the coverage area and intensity of the image 1364 produced by scanned reflective beams 1360.

As described in the above examples, scanning/moving can be accomplished by various suitable techniques. It will be understood that any of the techniques described in the above examples of scanning can be used for moving and any of examples used for moving can be used for scanning. Again, it is envisioned that any number of alternative scanning/moving techniques can be used without deviating from the scope of the disclosed subject matter. For example, any of the above described examples can be used alone, or in conjunction with scanning/moving by a cartesian robot; a gantry robot; a cylindrical robot; spherical/polar robot; a SCARA robot; an articulated robot; a parallel robot; or in any combination thereof.

In some embodiments, the laser light source can be activated (i.e., produce a laser) when a sensor detects light. That is, if the laser light source requires minimal warm up time then the laser light source can be connected to sensors that detect and/or interact with traffic for illuminating the surface for viewing only when needed. This can reduce maintenance and save energy.

Figure 16:
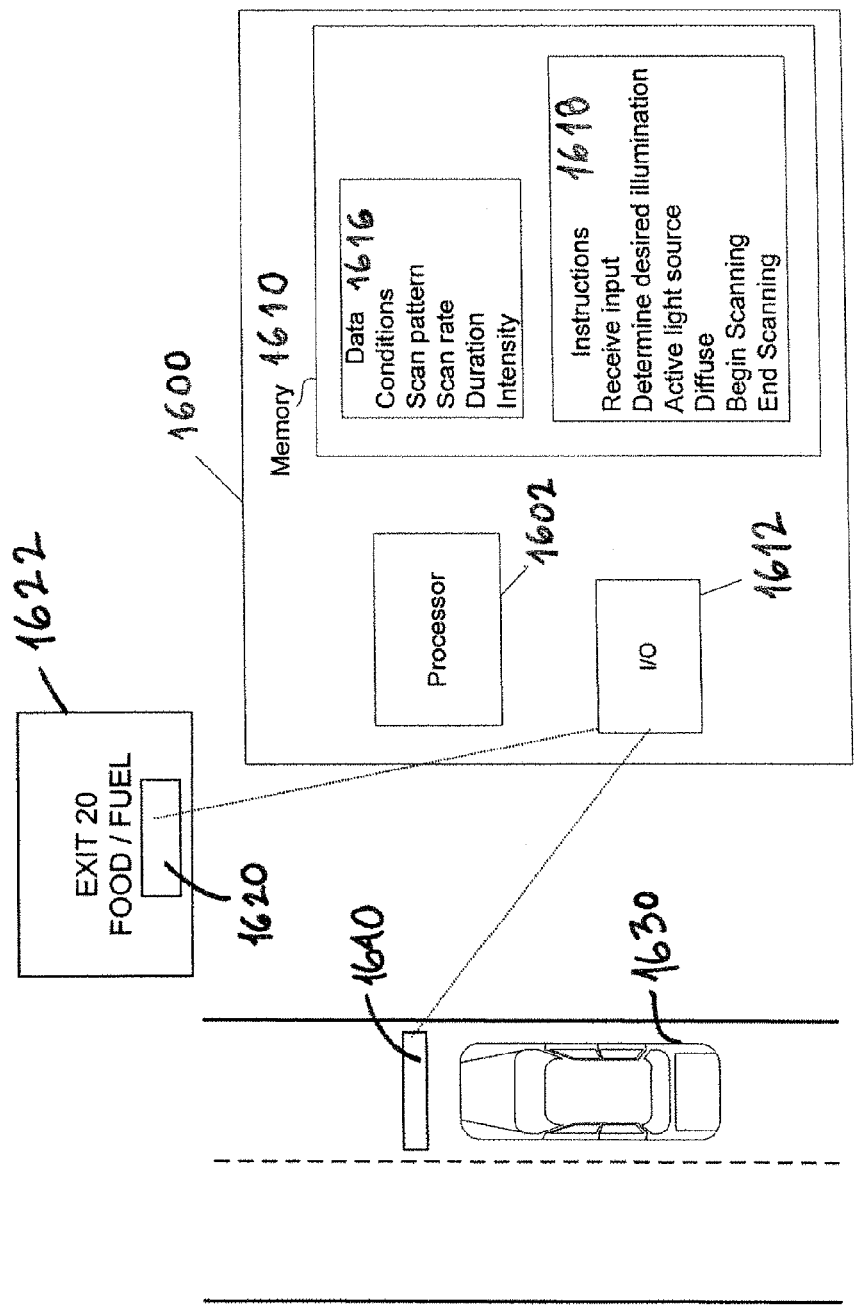
FIG. 16 is a diagrammatic representation of a system according to an aspect of the invention.

FIG. 16 shows a system according to an aspect of the invention including a computer 1600 connected to a sensor 1640 and an illumination system 1620. The computer 1600 may control the illumination device 1620 based on input from the sensor 1640. For example, sensor 1640 may be a traffic sensor configured to detect the presence of motor vehicles. As traffic sensor 1640 detects the presence of motor vehicle 1630, it may transmit a signal to the computer 1600. The signal may be transmitted via a wired connection or wirelessly. The computer 1600 in turn may instruct the illumination device 1620 to activate and illuminate road sign 1622 according to any of the method described herein. Thus, the road sign 1622 may be illuminated only when necessary (i.e., when a motorist is present to view it).

In accordance with one embodiment, the computer 1600 may include a processor 1602, memory 1610, input/output (I/O) port 1612, and other components typically present in general purpose computers.

Memory 1610 stores information accessible by the processor 1602, including instructions 1618 for execution by the processor 1602 and data 1612 which is retrieved, manipulated or stored by the processor 1602. The memory 1610 may be of any type capable of storing information accessible by the processor, such as a hard-drive, ROM, RAM, CD-ROM, write-capable, read-only, or the like.

The instructions 1618 may comprise any set of instructions to be executed directly (such as machine code) or indirectly (such as scripts) by the processor. In that regard, the terms "instructions," "steps" and "programs" may be used interchangeably herein. The functions, methods and routines of the program in accordance with the present invention are explained in more detail below.

Data 1616 may be retrieved, stored or modified by processor 1602 in accordance with the instructions 1618. The data may be stored as a collection of data. For instance, although the invention is not limited by any particular data structure, the data may be stored in computer registers, in a relational database as a table having a plurality of different fields and records, as an XML. The data may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

Although the processor 1602 and memory 1610 are functionally illustrated in FIG. 16 within the same block, it will be understood by those of ordinary skill in the art that the processor 1602 and memory 1610 may actually comprise multiple processors and memories that may or may not be stored within the same physical housing. For example, some or all of the instructions and data may be stored on removable CD-ROM and others within a read only computer chip. Some or all of the instructions and data may be stored in a location physically remote from, yet still accessible by, the processor. Similarly, the processor may actually comprise a collection of processors which may or may not operate in parallel.

As noted above, the computer 1600 may comprise additional components typically found in a computer system such as a display (e.g., an LCD screen), user input (e.g., a keyboard, mouse, game pad, touch-sensitive screen), a modem (e.g., telephone or cable modem), and all of the components used for connecting these elements to one another.

In addition or alternatively to merely illuminating the road sign 1622 in response to sensing traffic, other illumination effects may be used. For example, the illumination device 1620 may change a color of the light emitted, alter the brightness of the light, or modify the scanning routine (e.g., to produce a different shape image on a panel). It should be understood that such modifications of lighting effects by the illumination device 1620 may take place in response to any of a number of conditions. For example, the sensor 1640 may be used to detect light, sound, seismic conditions, color, distance, etc.

Although described as a computer system, it will be understood that computer system 1000 can be a stand-alone microprocessor capable of controlling any of the aforementioned scanning techniques.

According to one aspect, the computer 1600 may also receive information from the illumination system 1620. In this regard, for example, the computer 1600 may provide to a user information pertinent to maintenance of the illumination system 1620.

Although the present invention has been described with reference to particular embodiments, it should be understood that these examples are merely illustrative of the principles and applications of the present invention. Moreover, it should be understood that numerous other modifications may be made to the illustrative embodiments and that other arrangements may be devised without departing from the spirit and scope of the present invention as defined by the appended claims.

The invention claimed is:

1. A system for illuminating an object, comprising: a light source of coherent or semi-coherent light; a first diffuser positioned relative to the light source so as to receive said coherent or semi-coherent light, said diffuser diffusing the coherent or semi-coherent light to produce diffused light; and an actuator having a moveable element positioned to project the diffused light onto an object, wherein the object includes a display surface and a plurality of edge surfaces, and at least one of the edge surfaces includes the reflective coating.

2. A system for illuminating an object, comprising: a light source of coherent or semi-coherent light; a first diffuser positioned relative to the light source so as to receive said coherent or semi-coherent light, said diffuser diffusing the coherent or semi-coherent light to produce diffused light; and an actuator having a moveable element positioned to project the diffused light onto an object, wherein the actuator is at least partially positioned with the object.

3. A system for illuminating an object, comprising: a light source of coherent or semi-coherent light; a first diffuser positioned relative to the light source so as to receive said coherent or semi-coherent light, said diffuser diffusing the coherent or semi-coherent light to produce diffused light; and an actuator having a moveable element positioned to project the diffused light onto an object wherein the actuator is at least partially positioned with the object, and the moveable element is positioned with the object.

4. A method for illuminating an object, comprising: emitting coherent or semi-coherent light; diffusing the coherent or semi-coherent light to produce diffused light; projecting the diffused light onto the object; and scanning the diffused light on the object.

5. The method for illuminating according to claim 4, further comprising forming an image from the scanning of the diffused light.

6. The method for illuminating according to claim 4, further comprising modifying at least one of color, brightness, or scanning pattern of the diffused light in response to a predetermined condition.

7. The method for illuminating according to claim 4 further comprising reflecting the diffused light off the object and onto a display surface.

8. A system for illuminating an object, comprising: a sensor for detecting a condition; an illumination device communicatively coupled to the sensor, the illumination device comprising: a light source of coherent or semi-coherent light; a first diffuser positioned relative to the light source so as to receive said coherent or semi-coherent light, said diffuser diffusing the coherent or semi-coherent light to produce diffused light; and an actuator having a moveable element positioned to project the diffused light onto an object.

9. The system for illuminating an object according to claim 8, further comprising a processor, wherein the processor is communicatively coupled between the sensor and the illumination device.

10. The system for illuminating an object according to claim 9, wherein the processor is programmed to determine whether the illumination device requires maintenance.

11. The system for illuminating an object according to claim 8, wherein the condition detected by the sensor relates to at least one of light, sound, pressure, movement, seismic waves, and color.

12. The system for illuminating an object according to claim 8, wherein the condition detected by the sensor is the presence of a motor vehicle, and the illumination device illuminates a road sign.

\* \* \* \* \*